F. HACHMANN.
HOSE COUPLING.
APPLICATION FILED JUNE 13, 1914.
1,195,580.
Patented Aug. 22, 1916.
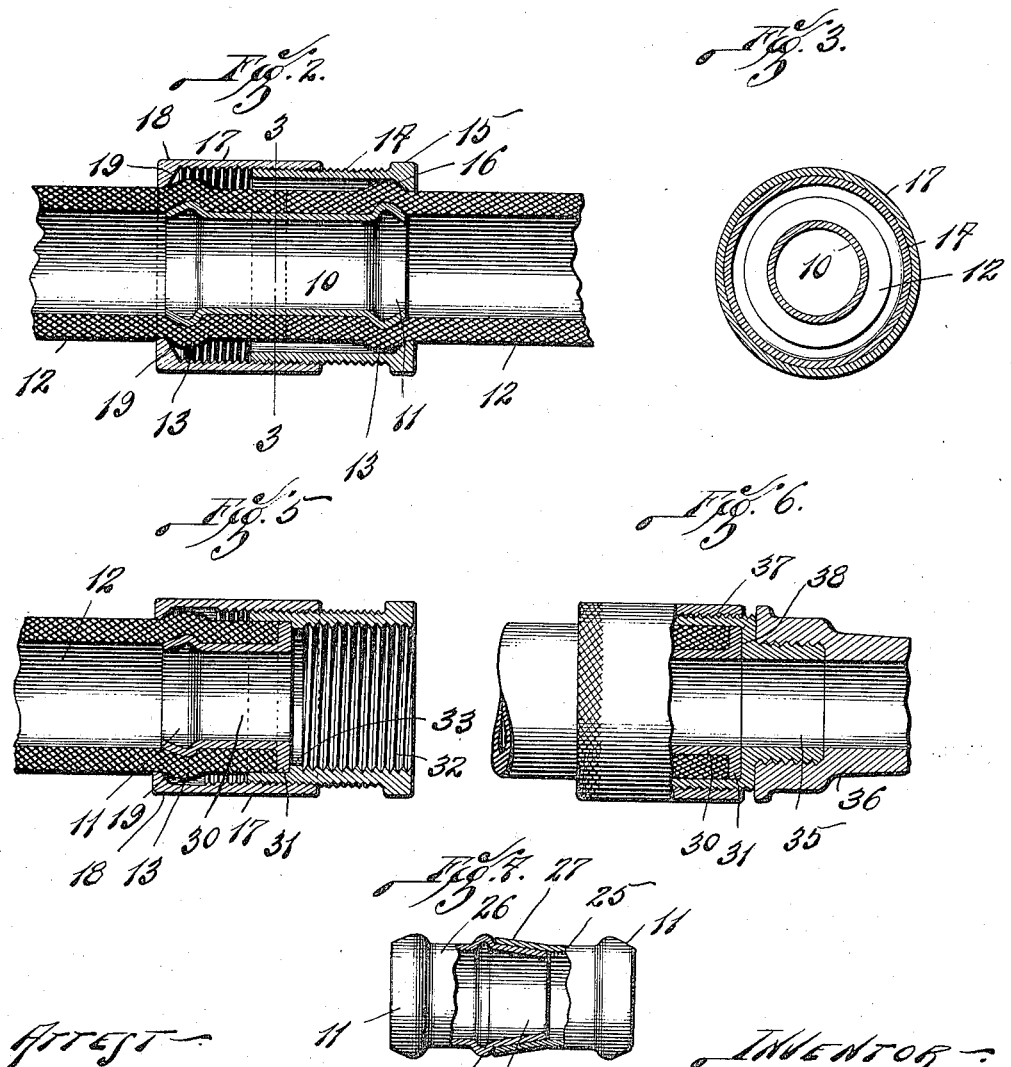

UNITED STATES PATENT OFFICE.

FREDERICK HACHMANN, OF ST. LOUIS, MISSOURI, ASSIGNOR, BY DIRECT AND MESNE ASSIGNMENTS, OF ONE-FOURTH TO FRED C. SCHOENTHALER, OF ST. LOUIS, MISSOURI, AND ONE-FOURTH TO JACOB MERZ AND ONE-FOURTH TO GEORGE S. HASKELL, BOTH OF CHICAGO, ILLINOIS.

HOSE-COUPLING.

1,195,580.  Specification of Letters Patent.  Patented Aug. 22, 1916.

Application filed June 13, 1914. Serial No. 844,995.

*To all whom it may concern:*

Be it known that I, FREDERICK HACHMANN, a citizen of the United States, and residing at St. Louis, in the State of Missouri, have invented certain new and useful Improvements in Hose-Couplings, of which the following is a specification.

This invention relates to hose couplings, and more particularly, to hose couplings for rubber or other flexible hose.

Some of the objects of this invention are, to provide a hose coupling which is simple in construction and operation, effective in its action, which consists of a few parts and is cheap to manufacture.

Further objects will appear from the detail description taken in connection with the accompanying drawing, in which:

Figure 1 is an elevation of a coupling embodying this invention. Fig. 2 is a longitudinal section on the line 2—2, Fig. 1. Fig. 3 is a transverse section on the line 3—3, Fig. 2. Fig. 4 is a view, partly in section, showing another form of nipple. Fig. 5 is a longitudinal section through a coupling, showing another embodiment of this invention, and Fig. 6 is a longitudinal section, showing still another embodiment of this invention.

Referring to the accompanying drawing, and more particularly, to Figs. 1, 2 and 3, 10 designates a nipple having annular enlargements or shoulders 11 formed on the ends thereof and adapted to be inserted into the ends 12 of a hose, so as to form annular enlargements 13 thereon. An externally threaded sleeve 14 is provided with a knurled head or portion 15, and with a clamping shoulder 16. The smallest inside diameter of this sleeve is slightly greater than the diameter of the hose, while the largest inside diameter is slightly greater than the diameter of the enlarged portion 13 formed on the hose when the nipple is inserted. A sleeve 17, provided with a knurled portion 18 and a clamping shoulder 19, is internally threaded to receive the sleeve 14, and the smallest internal diameter of this sleeve 17, is also slightly greater than the outside diameter of the hose.

To apply the device to join or couple hose sections the clamping sleeves 14 and 17 are first slipped over the ends of the hose for some distance back, and the nipple 10 is then inserted into the ends to be joined. It will be noted that the nipple, when inserted, will be entirely inclosed by the hose, and the annular shoulders 11 will form annular enlargements 13. The sleeves 14 and 17 are now brought together and screwed up tight, and this will cause the clamping shoulders 16 and 19 thereon to bear against the annular enlargements 13 and clamp the hose against the annular shoulders 11, so as to form a tight joint.

Fig. 4 shows a sectional nipple. In this construction, the nipple is composed of separable sections 25 and 26, the section 25 having its end 27 expanded to receive the contracted end 28 of the section 26, so as to form a cone joint. Since this nipple, as well as that shown in Fig. 2, is preferably constructed of sheet metal, a bead 29 is formed on the section 26 so as to form a stop shoulder for the section 25. The operation of this nipple is the same as in the construction shown in Figs. 1 to 3, inclusive, but, when the hose sections are taken apart, one nipple section will remain in one hose section, while the other nipple section will remain in the other hose section. When the hose sections are drawn together by the clamping sleeves, a firm water and air tight joint will be formed.

In the construction shown in Figs. 1 to 4, inclusive, the coupling member forms the connection between one section and the other section of the hose; in Figs. 5 and 6, however, this coupling member forms a connection between a hose section and a faucet or a nozzle.

Referring to Fig. 5, which shows a faucet connection, the nipple 30 is, in this case, provided with a flange 31, against which the end of the hose bears. An internally threaded faucet connection 32 has a shoulder 33 adapted to bear against the flange 31. The outside of this faucet connection is threaded to receive and coöperate with the internally threaded clamping sleeve 17, which is of the same construction as shown in Figs. 1 to 3, inclusive. The clamping action will be readily understood.

In Fig. 6, the coupling is made to a nozzle. In this construction, the nipple, as well as the clamping sleeve 17, is of the same construction as shown in Fig. 5. The coupling member 35 is, in this case, externally threaded to make a connection with a nozzle 36, and this coupling member has an enlarged externally threaded part 37, adapted to pass over the flange 31 on the nipple and the hose, and receive and coöperate with the internally threaded sleeve 17. A shoulder 38 is thus formed, which coöperates with and bears against the flange 31. The action of this coupling will be obvious. The coupling thus constructed forms a water, air and steam tight joint, since the hose forms its own gasket. Moreover, the application of this coupling does not tear or otherwise damage the hose, since the joint is made by smooth shoulders which merely clamp the hose therebetween. The device is, furthermore, simple in construction, as well as operation, and this result is obtained by constructing the clamping means surrounding the hose, so that they are self-contained and make no connection with the nipple itself. This construction, therefore, permits the nipple, as well as the clamping means, to be given a simple construction, and permits them to be manufactured cheaply from tubular blanks of thin metal which may be readily spun or pressed into shape. Moreover, since the nipple is entirely separate from the clamping means, this nipple can be made of a non-corrosive material, while the clamping means, which are external and entirely out of contact with the nipple or the inside of the hose, may be made of any suitable cheap material.

It is obvious that various changes may be made in details of construction without departing from the spirit of this invention, and it is, therefore, to be understood that this invention is not to be limited to the specific construction shown and described.

Having thus described the invention, what is claimed is:

1. A hose coupling comprising a nipple provided adjacent its ends with enlarged annular ribs adapted when the nipple is inserted into the hose sections to expand said sections at restricted points wholly remote from their meeting ends, said nipple consisting of a pair of separable sections telescopically engaged.

2. A hose coupling comprising a nipple having enlarged annular ribs adjacent its ends adapted when the nipple is inserted into the hose sections to expand the latter at points wholly remote from their meeting ends, said nipple consisting of a pair of separable sections whose meeting ends are provided, one with a taperingly expanded portion and the other with a taperingly contracted portion to enter and fit within said expanded portion for telescopically connecting said sections.

In testimony whereof I affix my signature in the presence of these two witnesses.

FREDERICK HACHMANN.

Witnesses:
  JAKE MERZ,
  J. D. WILSON.